F. SARGENT.
EDUCATIONAL DEVICE.
APPLICATION FILED JUNE 9, 1919.
1,332,761.
Patented Mar. 2, 1920.
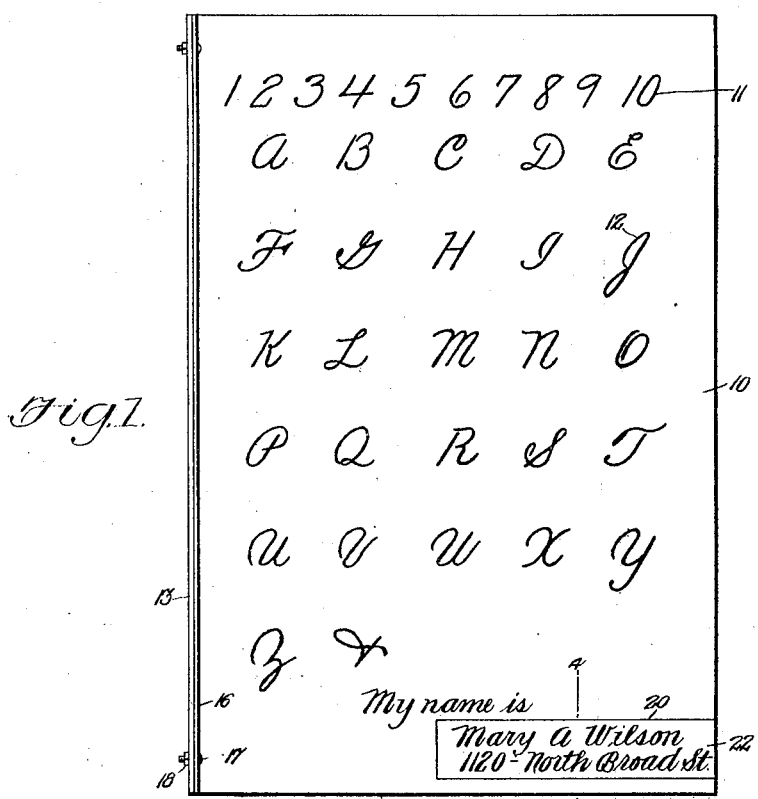
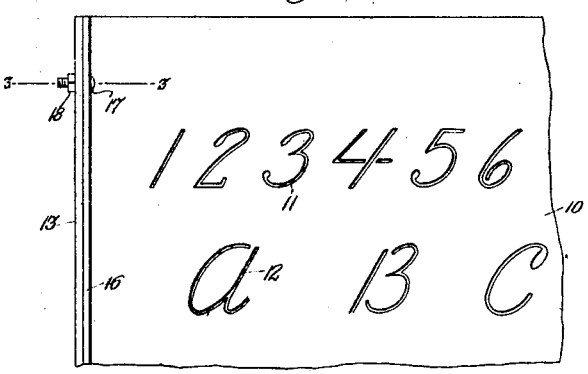
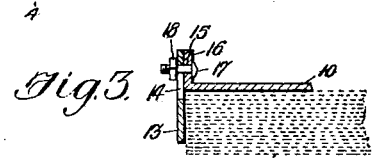
WITNESSES
INVENTOR.
F. Sargent,
BY
Victor J. Evans
ATTORNEY.

UNITED STATES PATENT OFFICE.

FRED SARGENT, OF RELIANCE, VIRGINIA.

EDUCATIONAL DEVICE.

1,332,761.  Specification of Letters Patent.  Patented Mar. 2, 1920.

Application filed June 9, 1919. Serial No. 302,978.

*To all whom it may concern:*

Be it known that I, FRED SARGENT, a citizen of the United States, residing at Reliance, in the county of Warren and State of Virginia, have invented new and useful Improvements in Educational Devices, of which the following is a specification.

This invention relates to new and useful improvements in educational devices and has for an object the provision of a device of this character which includes a plate or stencil by means of which persons may be taught the proper formation of letters and the hand trained and guided in such formation, the invention being especially useful for teaching children or others, who are backward in penmanship.

Another object is the provision of novel means for holding the stencil in position over a paper pad or slate, the said means preventing the stencil from slipping, but permitting of its ready removal for the purpose of viewing the written work.

A further object is to provide adjustment for the stencil holding means, so as to adapt it to pads or slates of different thickness.

Other objects and advantages of the invention will appear as the following description is read in connection with the accompanying drawings.

In the drawings:

Figure 1 is a plan view of the device.

Fig. 2 is an enlarged fragmentary plan of one corner of the same.

Fig. 3 is a sectional view on the line 3—3 of Fig. 2, showing a portion of the pad in position beneath the device.

Fig. 4 is a detail section on the line 4—4 of Fig. 1.

Referring in detail to the drawings, wherein like characters of reference denote corresponding parts, the invention as herein shown and described includes a preferably metallic plate 10, which is cut or stamped to provide openings in the form of figures and letters 11 and 12, respectively, the figures running from 1 to 10 and the letters being the capital letters of the alphabet. It is, of course, understood that letters or characters of any formation may be substituted for those shown.

The particular novelty of the invention resides in the means for removably holding the plate in position upon a pad or slate and includes a plate 13, which is provided with spaced transversely disposed slots 14. These slots are adapted to register with openings 15, formed in a flange 16 disposed along one edge of the plate 10. A suitable fastening device, herein shown as a bolt 17 and a clamping nut 18, is passed through the slots 14 and the openings 15, and holds the plate 13 at a right angle to the plate 10. The plate 13 is adapted to engage the edge of a pad 19, which is indicated in Fig. 3, so that the plate 10 will rest upon the upper surface of the pad. The characters cut and stamped are of sufficient width to permit of the insertion of a pencil point or other writing instrument, so that the outlines of the characters may be traced upon the pad. By this means the user will become familiar with the formation of the characters, as will be readily apparent.

The plate 10 is provided with a slot 20, the opposed walls of which are wedge-shaped for entrance into V-shaped grooves 21 formed in a removable plate 22. This plate may contain suitable indicia, but is primarily intended to contain the name and address of the owner or user of the device, as shown in Fig. 1.

The invention is susceptible of various changes in its form, proportions and minor details of construction and the right is herein reserved to make such changes as properly fall within the scope of the appended claims.

Having described the invention, what is claimed is:

1. A device of the class described embodying a plate having stencils cut therein and a right angled flange located along the edge of said plate for contact with the article to be stenciled.

2. A device of the class described embodying a plate having stencil openings therein and a right angularly disposed transversely adjustable flange carried by the edge of the plate.

3. A device of the class described embodying a plate having stencil openings therein, a right angularly disposed flange formed along the edge of the plate and having openings in said flange, a plate secured to the flange and clamping devices passing through the openings in said flange and through elongated slots formed transversely of the last mentioned plate.

In testimony whereof I affix my signature.

FRED SARGENT.